United States Patent [19]

Svensson

[11] 4,200,037
[45] Apr. 29, 1980

[54] DEVICE FOR TRANSFER OF SUBSTANTIALLY FRESH AIR FROM A STATIONARY PLACE TO A MOVING RECEIVING PLACE

[76] Inventor: Sven E. Svensson, Box 465, 801 06 Gävle, Sweden

[21] Appl. No.: 868,449

[22] Filed: Jan. 10, 1978

[30] Foreign Application Priority Data

Jan. 25, 1977 [SE] Sweden .................. 7700757

[51] Int. Cl.² .................. F24F 7/04; F24F 13/02
[52] U.S. Cl. .................. 98/40 R; 98/40 C; 98/115 VM
[58] Field of Search .......... 98/115 R, 115 VM, 40 R, 98/40 C; 137/580; 202/263

[56] References Cited

U.S. PATENT DOCUMENTS

| | | | |
|---|---|---|---|
| 2,923,227 | 2/1960 | Hawley | 98/115 VM |
| 3,019,813 | 2/1962 | Dommann | 137/580 |
| 3,064,549 | 11/1962 | Newton | 98/115 VM |
| 3,326,234 | 6/1967 | Baker et al. | 137/580 |
| 3,377,940 | 4/1968 | Werner et al. | 98/115 VM |
| 3,814,130 | 6/1974 | Allen et al. | 137/580 |

FOREIGN PATENT DOCUMENTS 111235 6/1964 Czechoslovakia ............... 98/115 VM
1310980 3/1973 United Kingdom .

*Primary Examiner*—Henry C. Yuen
*Attorney, Agent, or Firm*—LeBlanc, Nolan, Shur & Nies

[57] ABSTRACT

A device for transfer of preferably fresh air from a stationary place to a movable place. A stationary elongated box with fresh air supply is provided with a longitudinal slot closeable by a tightening band bearing against the rigid inside surfaces of the box at each side of the slot. A connection body projects through and is movable along said slot and is provided with guide edges against the inside surfaces of the box adjacent the slot and with backing rollers bearing against the outside parts of the box along the edges of the slot. Further, the connection body has a slide part locating inside of the box for lifting the tightening band from the slot edges and has passages permitting air to flow from the box through the connection body and to an outlet pipe connected to the movable place.

2 Claims, 4 Drawing Figures

DEVICE FOR TRANSFER OF SUBSTANTIALLY FRESH AIR FROM A STATIONARY PLACE TO A MOVING RECEIVING PLACE

BACKGROUND OF THE INVENTION

The present invention refers to a device for transfer of substantially fresh air from a stationary place to a moving receiving place as in a movable operating cabin or the like on a traverse or the like.

It is known to arrange fresh air supply to a moving operating cabin by means of a flexible tube that does not hinder the movement of the operating cabin, but partly it is troublesome to give the flexible tube support and guide, while the operating cabin is moved, partly the movable flexible tube easily is a hindrance. The disadvantages with a flexible tube are avoided by an embodiment according to my co-pending application Ser. No. 866,415, filed Jan. 3, 1978, but therein it is required that a vacuum is maintained in the device.

The present invention refers to such an embodiment that no over-pressure is required in the device for transfer of substantially fresh air to a moving air exhaust place.

For that reason a device for transfer of substantially fresh air from a stationary place to a moving air receiving place, as known, comprises a stationarily arranged elongated box that partly has a tube or the like connectable to a stationary place which partly in its longitudinal direction has a slot that is closeable by a tightening band covering the slot and at its ends is firmly united with said box. A connection body provided with passage for fresh air supply to the receiving place is guided in and displaceable along the slot while it is sliding against the tightening band that is held in contact with the connection body by means of press members supported by the body and acting against the tightening band.

According to the present invention the tightening band is placed inside the box in tightening bearing on the edge parts of the box at the slot so that an over-pressure in the box acts for tightening pressing of the tightening band along the slot edges without hindering longitudinal displacement of the connection body.

The invention is illustrated by an embodiment shown on the accompanying drawing as an example.

Figures 1, 2, 3, 4:
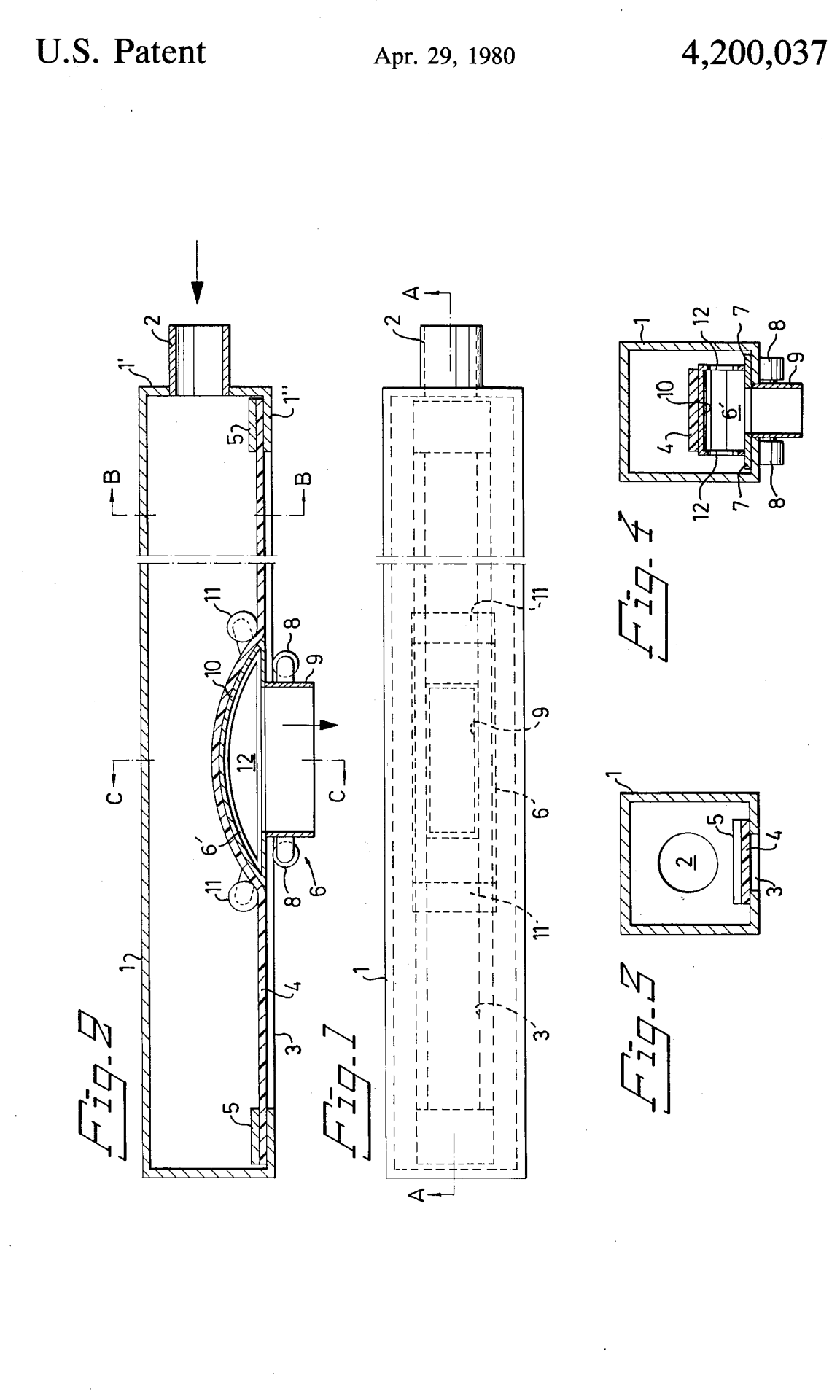

FIG. 1 is a plan view of the device according to the invention and with a middle part cut away.

FIG. 2 is a longitudinal section along line A—A in FIG 1.

FIG. 3 is a cross section along the line B—B in FIG. 2.

FIG. 4 is a cross section along the line C—C in FIG. 2.

The device shown on the drawing comprises an elongated in cross section rectangular box 1 to the one end wall 1' of which an inlet tube 2 is connected and the length of which is adjusted after occurring need. In the one longitudinal side, or bottom side 1" of the box 1 when it has the position shown on the drawing, there is arranged a longitudinal slot 3. Inside the box 1 and bearing on the edge parts of the box bottom 1" along the slot 3 an air impenetrable tightening band or tightening belt 4 is placed, the ends of which are fastened to attachments 5 at the ends of the box.

A hollow connection body 6 extends transverse through and is displaceably positioned in the slot 3 in that way that it partly with two guiding edges 7 is bearing against the inside and with two backing rollers 8 is bearing against the outside of the edge parts of the box bottom along the slot 3 and further by means of an outlet pipe 9 rectangular in cross section is bearing against the longitudinal walls of the slot 3. The part of the connection body existing within the slot 3 is formed to a convexly arcuate slide path 10 for the tightening band 4 in the longitudinal direction of the slot 3 at which the connection body 6 supports press members 11 at the ends of the slide path 10 in order to hold the tightening band bearing on the slide path. The press members 11 can be in the shape of slide shoes, for instance of teflon, or in the shape of rollers and in both cases in themselves elastic or elastic arranged.

The hollow connection body 6 inside the box has side openings 12, which together with the cavity 6' of the connection body 6 and its outlet tube 9 form a passage in the connection body 6.

The described device is used and serves in the following way. The box 1 is fixed along the movement way of the device, as an operating cabin in a factory, that shall be furnished with fresh air during its movement. The inlet tube 2 is connected to a pressure air source and possibly also to a heating, cooling and/or moistening aggregate, filter etc. in order to obtain desired air quality. The outlet pipe 9 is adapted directly or by means of an attached short extension pipe to end into and to be connected with the operating cabin that consequently during its movement displaces the connection body 6 in the slot and air is continuously transferred from the box 1 to the operating cabin in connection with that the slide path 10, certainly, lifts the tightening band 4 from the slot 3 but the slot nevertheless continuously is tightened by the tightening band parts existing on each side besides the slide path 10 on account of the presence of the press members 11 and the over-pressure existing in the box 1 and obtained by the pressure air. The over-pressure in the box may be controllable by choking of the air flow on the outlet side.

The device according to the invention especially has the advantage that it lacks flexible tubes for transfer of fresh air to the moving operating cabin and that the device is reliable in service and consists of relatively simple, easily manufactured parts. Further, for instance two devices according to the invention can be coupled together in for instance T-shape at which the inlet tube of the one box is connected to the outlet tube of the other box and the outlet tube of firstmentioned box is connected to an operating cabin that is movable for instance along and transverse over a factory room.

The invention shall not be considered to be restricted to the described and on the drawing shown embodiment only, as this one can be modified within the scope of the invention. For instance the cross section shape of the box and of the outlet tube can be varied and the members of the connection body, so as to partly be guided and retained in the slot partly guide the tightening band in relation to the connection body, can be modified and further the slide path of the connection body can be replaced by a number of rollers.

What I claim is:

1. A device for transfer of substantially fresh air from a stationary place to a moving, air receiving, place comprising: a stationarily arranged elongated box with walls and with air inlet means connected thereto and one of its elongate walls, in its longitudinal direction, having a longitudinal slot; a tightening band within said box, extending along and covering said slot and having its ends firmly secured to said box; a connection body provided with air passage means including outlet means for fresh air supply to the receiving place projecting through, guided in and displaceable along said slot and having a slide path surface solely slidably engaged with the outer surface of said tightening band which faces said slot; said connection body air passage means includes side inlet openings in and a cavity within said connection body and said outlet means is an outlet pipe from said cavity projecting through said slot in guided relationship therealong; press members on said connection body engage the opposite inner surface of said band to hold said band in contact with said connection body; said tightening band being disposed in surface engagement against the inner edge parts of the box wall adjacent said slot so that an over-pressure in said box presses the tightening band in tight surface engagement along said slot edge parts without hindering longitudinal displacement of said connection body; said connection body having portions disposed interior of said box provided with guide means slidably engaging the inside surface of the slot edge parts under said band; and backing support rollers on said connection box bearing against the outside surface of the slot edge parts of said box.

2. A device as claimed in claim 1, characterized in that said connection body is provided with a slide surface located within said box and engaging the first mentioned surface of said tightening band, said slide surface being arcuately convex in the longitudinal direction of the slot.

* * * * *

UNITED STATES PATENT AND TRADEMARK OFFICE
CERTIFICATE OF CORRECTION

PATENT NO. : 4,200,037
DATED : April 29, 1980
INVENTOR(S) : Sven E. Svensson

It is certified that error appears in the above-identified patent and that said Letters Patent are hereby corrected as shown below:

Column 1, line 22, change "no" to --an--.

Signed and Sealed this

First Day of July 1980

[SEAL]

Attest:

SIDNEY A. DIAMOND

Attesting Officer    Commissioner of Patents and Trademarks